(No Model.)

M. A. STÜBEL.
PHOTOGRAPHIC PLATE HOLDER.

No. 539,557. Patented May 21, 1895.

Witnesses:
Fred Haynes
George Barry.

Inventor:
Moritz Alphons Stübel
by his attorneys
Brown & Seward

UNITED STATES PATENT OFFICE.

MORITZ ALPHONS STÜBEL, OF DRESDEN, GERMANY.

PHOTOGRAPHIC-PLATE HOLDER.

SPECIFICATION forming part of Letters Patent No. 539,557, dated May 21, 1895.

Application filed December 31, 1894. Serial No. 533,392. (No model.)

*To all whom it may concern:*

Be it known that I, MORITZ ALPHONS STÜBEL, a resident of Dresden, in the Kingdom of Saxony and Empire of Germany, have invented a certain new and useful Improvement in Photographic-Plate Holders, of which the following is a specification.

A photographic plate holder embodying my invention consists of three separate parts, such plate holder being intended for inclosing the sensitive plate or film, for inserting the plate or film in the camera, for exposing the same in the camera and for transporting such plate or film prior to exposure or after exposure.

This plate holder, besides fully excluding the light when closed and allowing its opening and closing within its frame in the camera, presents the advantage of occupying extremely small space, as its dimensions do not exceed those of an ordinarily large letter. Such plate holder therefore is particularly adapted for photographic purposes outside the studio (in the open air) and especially for tourists.

The plate holder consists of three parts which I term respectively the "inner casing," the "pocket" and the "outer casing," the inner casing receiving the sensitive plate or film, the pocket receiving the inner casing and the sensitive plate, and the outer casing receiving the pocket with the inner casing and sensitive plate.

Figure 1:
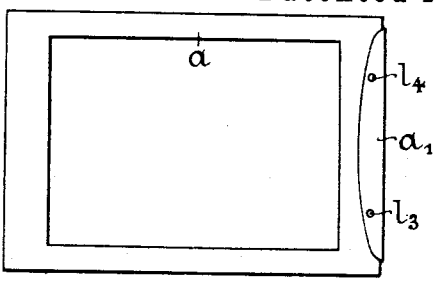
Figure 4:
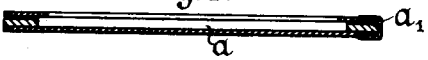
Figure 2:
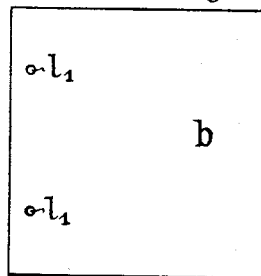
Figure 3:
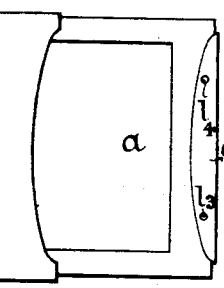
Figure 5:
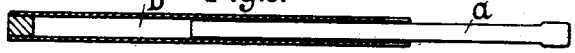
Figure 7:
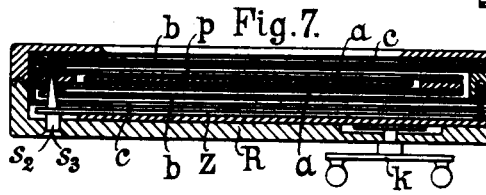
Figure 8:
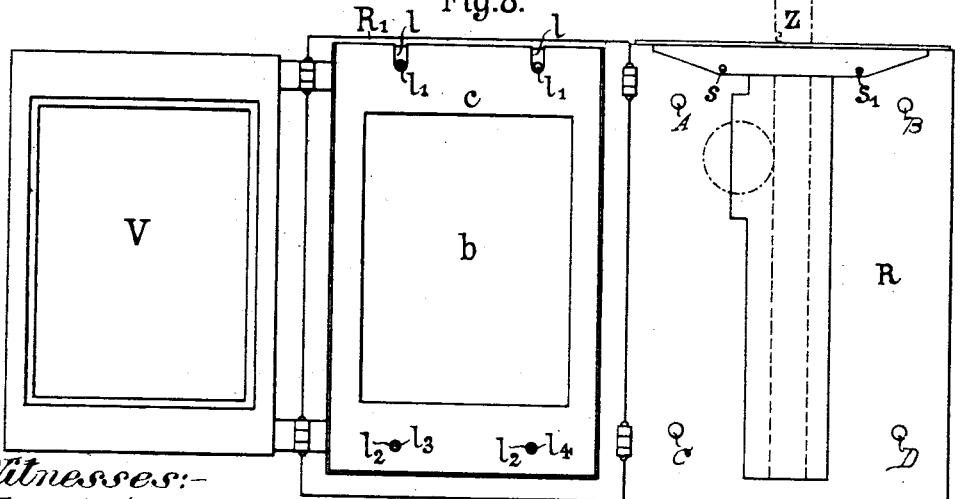

Figure 1 is a front view of the inner casing; Fig. 2, a face view of the pocket with the inner casing partly inserted therein, and Fig 3 a front view of the outer casing. Fig. 4 represents a longitudinal section of the inner casing; Fig. 5, a longitudinal section corresponding with Fig. 2, and Fig. 6 a longitudinal section of the outer casing. Fig. 7 represents a longitudinal section of the plate-holder and the frame in which it is placed for insertion in the camera. Fig. 8 is a front view of the frame open and of the plate-holder therein.

Similar letters of reference designate corresponding parts in all the figures.

I will now describe in detail the several parts of the plate holder.

The inner casing consists of two equally large sides or layers $a$ of card-board or other suitable material, which are connected at one of the shorter sides by means of a clamp $a'$ of sheet metal or other material. The one side or face is closed as shown in the section Fig. 4, whereas the other side or face is cut out to form an opening corresponding approximately with the size of the sensitive plate or film. Between the closed and open sides of this inner casing, the sensitive plate or film is inserted so that the said casing forms for the said plate or film a thin frame with a solid back. The metal clamp $a'$ is provided with two holes $l^4$ $l^3$.

The pocket $b$ is closed on both faces and open only at one of its shorter sides or ends as shown in the section Fig. 5, and forms a case or sheath into which the inner casing $a$ $a'$ tightly fits. This pocket is provided at its closed end with two holes $l'$ $l'$.

Figure 6:
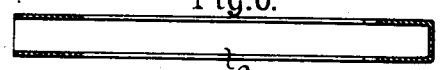

The outer casing $c$, which serves for the reception of the pocket $b$ with the inner casing $a$ $a'$ inside it, is cut out or open on both faces as shown in the section Fig. 6 to about the size of the sensitive plate or film and is provided with four holes of which $l^2$ $l^2$ correspond with the holes $l^3$ $l^4$ of the inner casing $a$ $a$ and of which $l$ $l$ correspond with the holes $l'$ $l'$ of the pocket if all the parts are placed one within another. The holes $l$ $l$ are open to the edge of the outer casing $c$.

A sensitive plate or film embedded within such a plate holder is completely protected against light and ready for transport and the weight of the whole is very slight, the entire thickness being about one fourth that of the usual wooden plate holder. For inserting this dark slide $a$ $a'$, $b$ $c$, consisting of three parts as described and inclosing the sensitive plate or film, within the camera, I commonly employ the frame shown in Figs. 7 and 8. This frame also consists of three parts which are hinged together. The center part R' is cut out to form an opening to which the ground glass focusing screen V is fitted for focusing the camera with reference to the object to be photographed. When, after such focusing operation, the frame is removed from the camera, the plate holder above specified is put exactly in the place which has been occupied by the screen V as shown at $b$ and $c$ in Fig. 8, and the full part or cover R of the frame is laid over the plateholder. The full part or cover R carries a slide $z$ the rod of which is provided with a rack, with which engages a pinion which may be rotated by a crank K from outside the camera. The enlarged part of the slide $z$ is provided with two pins $s\ s'$ which when the slide is within the cover R, engage with the holes $l'\ l'$ of the pocket $b$. The frame R' is provided with two pins $s^2\ s^3$ (Fig. 7) which enter the holes $l^2\ l^2$ of the outer casing $c$ and in the holes $l^3\ l^4$ of the inner casing $a\ a'$, thus keeping the entire plate holder in the frame R'. The position of the plate holder in the frame R' is furthermore secured by spring buttons A B C D provided in the cover R which buttons slightly press upon the outer casing $c$ when the cover R is folded upon R'.

If now the frame R' with the plate holder in it and covered by the cover R and by the screen V, is inserted into the focused camera, the crank K is turned, thus driving out the slide $z$. The pins $s\ s'$ of this slide, which are in the holes $l'\ l'$ of the pocket $b$, remove the latter out of the outer casing $c$, the holes $l\ l$ in the latter permitting this removal because they are open to the edge. By so removing the pocket $b$ by the slide, which position is shown in dotted lines in Fig. 7, the sensitive plate in the plate holder $a\ a'$ is laid free and may be exposed to light. When such exposure has taken place, the crank K is turned the reverse way, thus shifting the pocket $b$ into the outer casing $c$ and over the inner casing $a\ a'$, thereby covering the sensitive plate or film which is now completely protected against light. The frame R' may now be removed from the camera and opened so that the plate holder may be taken away and exchanged for a fresh one. The exposed and removed plate holder may now simply be put in a paper envelope. Any necessary remarks or notes may be made on such envelope, and the plate holder may be kept until the exposed plate or film is developed in the dark room.

The crank and rack or pinion device above described may be substituted by any other mechanical device or the removal of the pocket $b$ from the plate holder within the camera may even be done by hand if preferred.

The light weight and the easy handling of the plate holder will allow the outdoor photographer or the tourist to take as many plate holders each provided with a sensitive plate or film along with him as he intends to take photographic pictures. Every inconvenience of transporting plates or films, exchanging them in the camera is entirely avoided.

What I claim as my invention is—

A plate holder for containing and transporting sensitive plates or films for photographic purposes consisting of the combination of the inner casing $a\ a'$ open on one face for receiving the sensitive plate or film, with the pocket $b$ closed on both faces for the reception of said inner casing and the outer open faced casing $c$ for the reception of the pocket, the said pocket being removable and replaceable between said outer and inner casings, substantially as and for the purpose herein set forth.

In testimony that I claim the foregoing as my invention I have signed my name in presence of two subscribing witnesses.

MORITZ ALPHONS STÜBEL.

Witnesses:
GEORG RICHTER,
WILHELM WIESENHÜTTER.